(12) United States Patent  (10) Patent No.: US 8,015,798 B2
Norris et al.  (45) Date of Patent: Sep. 13, 2011

(54) GEARED COUNTER-ROTATING GAS TURBOFAN ENGINE

(75) Inventors: James W. Norris, Lebanon, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1127 days.

(21) Appl. No.: 11/955,630

(22) Filed: Dec. 13, 2007

(65) Prior Publication Data

US 2009/0151317 A1   Jun. 18, 2009

(51) Int. Cl.
*F02K 3/00*   (2006.01)

(52) U.S. Cl. ............... 60/268; 60/39.162; 60/226.1

(58) Field of Classification Search .......... 60/268, 60/226.1, 39.162; 415/9, 174.4; 416/2
See application file for complete search history.

(56) References Cited

U.S. PATENT DOCUMENTS

| | | | |
|---|---|---|---|
| 3,463,421 A | 8/1969 | Pyptiuk | |
| 3,673,802 A * | 7/1972 | Krebs et al. | 60/226.1 |
| 3,729,957 A * | 5/1973 | Petrie et al. | 60/226.1 |
| 3,866,415 A * | 2/1975 | Ciokajlo | 60/226.1 |
| 4,005,575 A * | 2/1977 | Scott et al. | 60/226.1 |
| 4,251,987 A * | 2/1981 | Adamson | 60/805 |
| 4,751,816 A * | 6/1988 | Perry | 60/226.1 |
| 4,790,133 A | 12/1988 | Stuart | |
| 4,827,712 A * | 5/1989 | Coplin | 60/226.1 |
| 4,860,537 A | 8/1989 | Taylor | |
| 4,909,031 A | 3/1990 | Grieb | |
| 4,916,894 A * | 4/1990 | Adamson et al. | 60/226.1 |
| 4,947,642 A | 8/1990 | Grieb et al. | |
| 4,969,325 A * | 11/1990 | Adamson et al. | 60/226.1 |
| 4,976,102 A | 12/1990 | Taylor | |
| 5,010,729 A * | 4/1991 | Adamson et al. | 60/226.1 |
| 5,274,999 A | 1/1994 | Rohra et al. | |
| 5,694,767 A | 12/1997 | Vdoviak et al. | |
| 6,082,967 A | 7/2000 | Loisy | |
| 6,339,927 B1 | 1/2002 | DiPietro, Jr. | |
| 6,381,948 B1 * | 5/2002 | Klingels | 60/226.1 |
| H2032 H | 7/2002 | DiPietro, Jr. | |
| 6,666,017 B2 | 12/2003 | Prentice et al. | |
| 6,684,626 B1 | 2/2004 | Orlando et al. | |
| 6,711,887 B2 | 3/2004 | Orlando et al. | |
| 6,739,120 B2 | 5/2004 | Moniz et al. | |
| 6,763,652 B2 | 7/2004 | Baughman et al. | |
| 6,763,653 B2 | 7/2004 | Orlando et al. | |
| 6,763,654 B2 | 7/2004 | Orlando et al. | |
| 7,055,306 B2 | 6/2006 | Jones et al. | |
| 7,185,484 B2 | 3/2007 | Griffin, III et al. | |
| 7,246,484 B2 | 7/2007 | Giffin, III et al. | |
| 7,363,757 B2 * | 4/2008 | Loisy | 60/226.1 |
| 7,513,103 B2 * | 4/2009 | Orlando et al. | 60/268 |
| 7,726,113 B2 * | 6/2010 | Orlando et al. | 60/39.162 |
| 7,752,836 B2 * | 7/2010 | Orlando et al. | 60/268 |
| 2006/0090451 A1 * | 5/2006 | Moniz et al. | 60/226.1 |
| 2008/0120839 A1 * | 5/2008 | Schilling | 29/888.02 |
| 2010/0154384 A1 * | 6/2010 | Schilling | 60/268 |

* cited by examiner

*Primary Examiner* — William H Rodríguez
(74) *Attorney, Agent, or Firm* — Carlson Gaskey & Olds PC

(57) ABSTRACT

A gas turbine engine includes a gear system driven by a first and second counter rotating low pressure shaft and a fan driven by the gear system.

12 Claims, 2 Drawing Sheets

GEARED COUNTER-ROTATING GAS TURBOFAN ENGINE

BACKGROUND OF THE INVENTION

The present invention relates to a gas turbine engine and more particularly to a gas turbine engine with a fan driven through a geared counter-rotating low pressure spool.

Gas turbofan engines are subject to ever increasing demands to decrease system fuel burn. There is an inherent mismatch between the speeds at which a turbine develops power efficiently and that of a fan (propulsor) which operates more efficiently at lower speeds.

Counter-rotating systems with a counter-rotating rotor that drives a counter-rotating fan may provide efficient operation as every airfoil is involved in compression or power extraction. This results in a relatively shorter and lighter machine. Disadvantageously, the counter-rotating fan may be relatively complicated and may generate significant acoustic disturbances.

SUMMARY OF THE INVENTION

A gas turbine engine according to an exemplary aspect of the present invention includes: a first low pressure shaft; a second low pressure shaft that counter-rotates relative to the first low pressure shaft; a gear system driven by the first low pressure shaft and the second low pressure shaft; and a fan driven by the gear system.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE DISCLOSED EMBODIMENT

Figure 1:
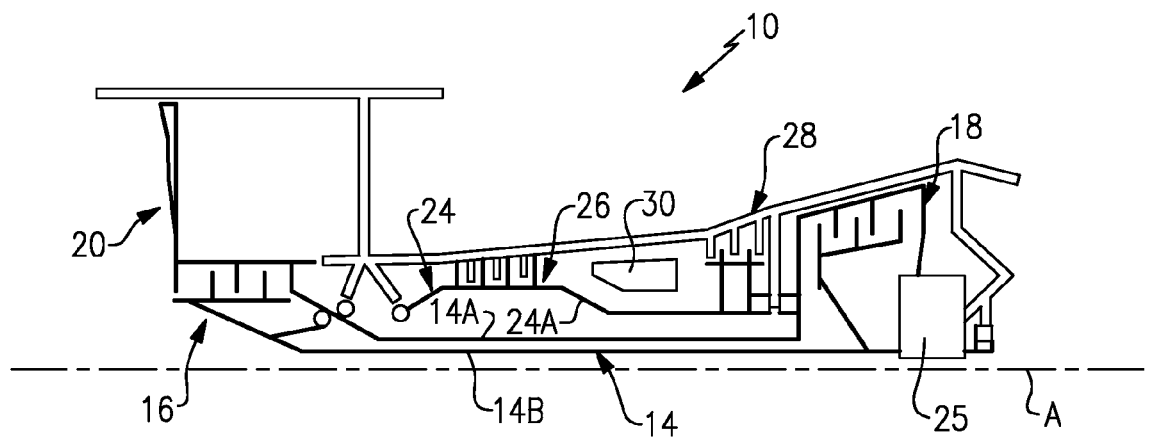
FIG. 1 is a general schematic view of one non-limiting embodiment a geared turbofan engine.

FIG. 1 illustrates a general schematic view of a gas turbofan engine 10. The turbofan engine 10 includes a low pressure spool 14 and a high pressure spool 24 which rotate about an engine axis of rotation A. The low pressure spool 14 includes a counter-rotating low pressure compressor 16 and a counter rotating low pressure turbine 18 driven by a first low pressure shaft 14A which counter-rotates relative a second low pressure shaft 14B. The high pressure spool 24 includes a high pressure compressor 26 and high pressure turbine 28 mounted to a high pressure shaft 24A for rotation therewith. A combustor 30 is arranged between the high pressure compressor 26 and high pressure turbine 28.

Core airflow compressed by the counter-rotating low pressure compressor 16 and the high pressure compressor 26 is mixed with the fuel in the combustor 30, ignited, and burned. The resultant high pressure combustor products are expanded through the high pressure turbine 28 and counter rotating low pressure turbine 18. The turbines 28, 18 are rotationally coupled to the compressors 26, 16 to respectively drive the compressors 26, 16 in response to the expansion of the combustor product.

The low pressure spool 14 drives a fan section 20 through a gear system 25. The gear system 25 is located adjacent the counter rotating low pressure turbine 18 to combine power outputs of the first low pressure shaft 14A and the second low pressure shaft 14B to drive the fan 20. As the low pressure spool 14 operates at relatively low mechanical speeds, the fan 20 is driven in unison with the first low pressure shaft 14A while power from the counter-rotating second low pressure shaft 14B is transferred to the fan 20 via the gear system 25.

Figure 2:
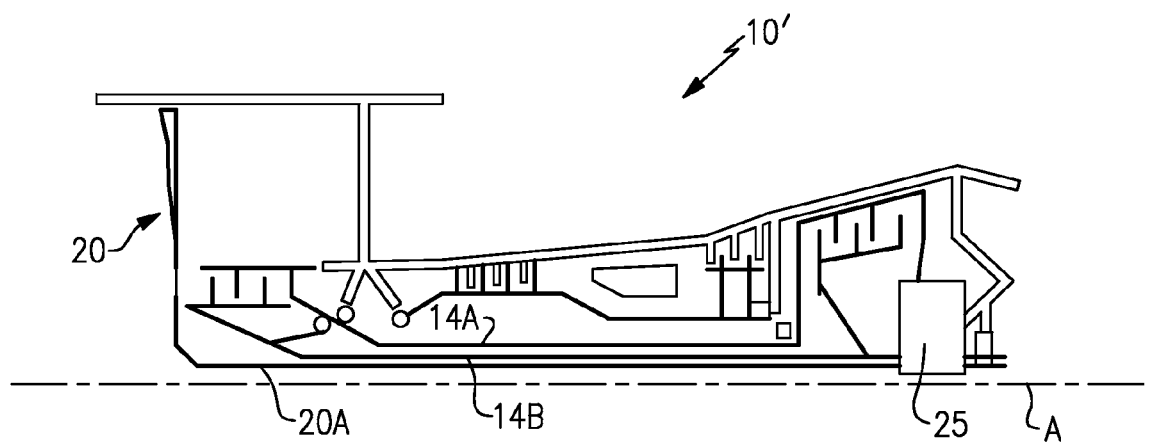
FIG. 2 is a general schematic view of another non-limiting embodiment a geared turbofan engine.
Figure 4:
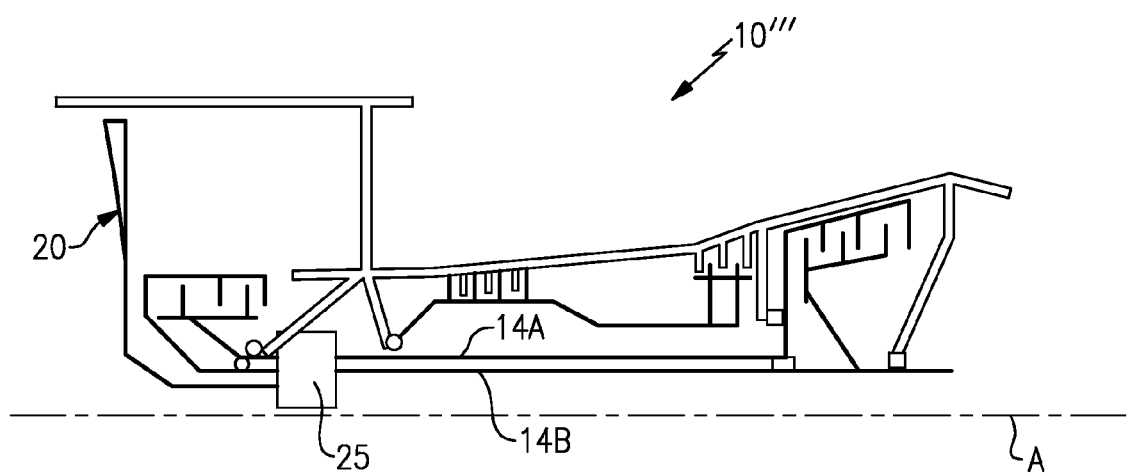
FIG. 4 is a general schematic view of another non-limiting embodiment a geared turbofan engine.

Referring to FIG. 2, power from both the first low pressure shaft 14A and the counter-rotating second low pressure shaft 14B is transferred to the fan 20 via the gear system 25 through a separate fan shaft 20A. That is, the first low pressure shaft 14A and the counter-rotating second low pressure shaft 14B drive the gear system 25 which drives the fan 20 through the shaft 20A which may be located through the low pressure spool 14 or alternatively through a fan shaft 20A' (FIG. 4). That is, the gear system 25 combines power from both of the first low pressure shaft 14A and the counter-rotating second low pressure shaft 14B to drive the fan shaft 20A. Coupling the first low pressure shaft 14A and the counter-rotating second low pressure shaft 14B facilitates speed control, and minimizing potential matching issues associated with counter rotating hardware. Counter rotating systems operate well at a design point, but may have issues off design such that tying the first low pressure shaft 14A and the counter-rotating second low pressure shaft 14B together may reduce such issues.

Connection of the counter-rotating low pressure turbine 18 with the gear system 25 and driving the fan directly with one half of the low pressure turbine 18, the power going thru the gear box is 50% of that required to drive the fan 20 which results in a lighter weightier gearbox.

Figure 3:
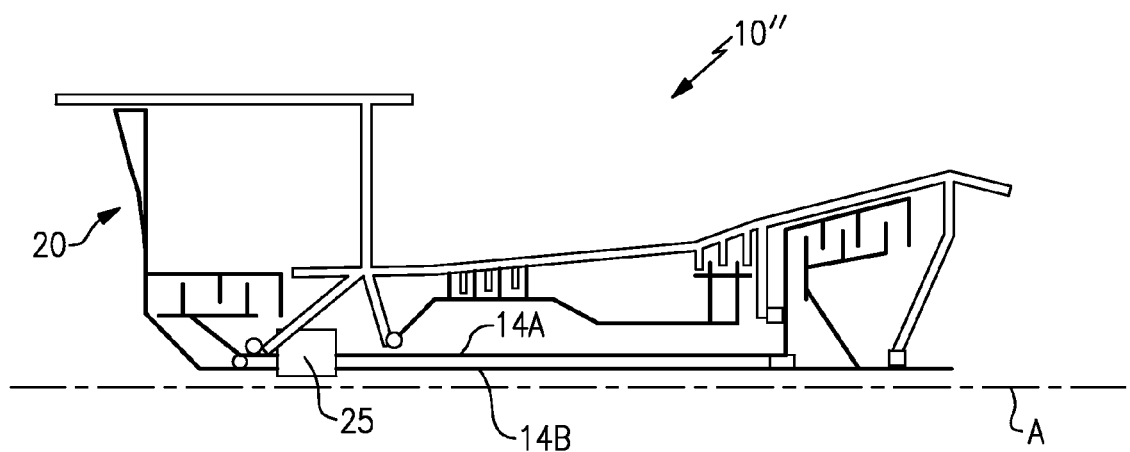
FIG. 3 is a general schematic view of another non-limiting embodiment a geared turbofan engine.

Referring to FIG. 3, the gear system 25 is located adjacent the counter rotating low pressure compressor 16 to combine power outputs of the first low pressure shaft 14A and the second low pressure shaft 14B to drive the fan 20 as generally described above. The gear system 25 may be an epicycle gear train such as a planetary gear system, star gear system or other gear system. It should be understood that various gear system 20 locations and arrangements may be utilized with the present invention to provide a relatively shorter, lighter system that operates with optimal aerodynamic speeds to provide decreased fuel burn.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
   a first low pressure shaft about an axis of rotation;
   a second low pressure shaft, said second low pressure shaft counter-rotates relative to said first low pressure shaft about said axis of rotation to form a counter-rotational low pressure spool with a counter-rotating low pressure compressor and a counter-rotating low pressure turbine;
   a high pressure spool which rotates about said axis of rotation, said high pressure spool defined radially outboard of said counter-rotational low pressure spool;
   a gear system driven by said first low pressure shaft and said second low pressure shaft, said gear system located adjacent said counter-rotating low pressure turbine driven by said first low pressure shaft and said second low pressure shaft; and
   a fan driven by said gear system, said fan axially forward of said counter-rotational low pressure compressor.

2. The gas turbine engine as recited in claim 1, wherein said gear system is located radially inboard of said low pressure counter-rotating turbine.

3. The gas turbine engine as recited in claim 1, wherein said gear system is located axially aft of said low pressure counter-rotating turbine.

4. The gas turbine engine as recited in claim 1, wherein said fan is driven in unison with said first low pressure shaft.

5. The gas turbine engine as recited in claim 1, wherein said fan is driven through said gear system by said second low pressure shaft.

6. The gas turbine engine as recited in claim 1, wherein said fan is a single stage fan.

7. The gas turbine engine as recited in claim 1, wherein said fan is driven by a fan shaft driven by said gear system, said fan shaft radially inboard of said first low pressure shaft and said second low pressure shaft.

8. The gas turbine engine as recited in claim 1, wherein said fan is driven in unison with said first low pressure shaft.

9. A gas turbine engine comprising:
   a first low pressure shaft about an axis of rotation;
   a second low pressure shaft, said second low pressure shaft counter-rotates relative to said first low pressure shaft about said axis of rotation to form a counter-rotational low pressure spool with a counter-rotating low pressure compressor and a counter-rotating low pressure turbine;
   a high pressure spool which rotates about said axis of rotation, said high pressure spool defined radially outboard of said counter-rotational low pressure spool;
   a gear system driven by said first low pressure shaft and said second low pressure shaft, said gear system located adjacent said counter-rotating low pressure compressor driven by said first low pressure shaft and said second low pressure shaft; and
   a fan driven by said gear system, said fan axially forward of said counter-rotational low pressure compressor.

10. The gas turbine engine as recited in claim 9, wherein said gear system is located radially inboard and axially between said counter-rotating low pressure compressor and a high pressure compressor of said high pressure spool.

11. The gas turbine engine as recited in claim 9, wherein said gear system combines power outputs of the first low pressure shaft and said second low pressure shaft to drive said fan.

12. The gas turbine engine as recited in claim 9, wherein said fan is a single stage fan.

* * * * *